(No Model.)
A. F. BOARDMAN.
FISHING REEL.
No. 475,030. Patented May 17, 1892.
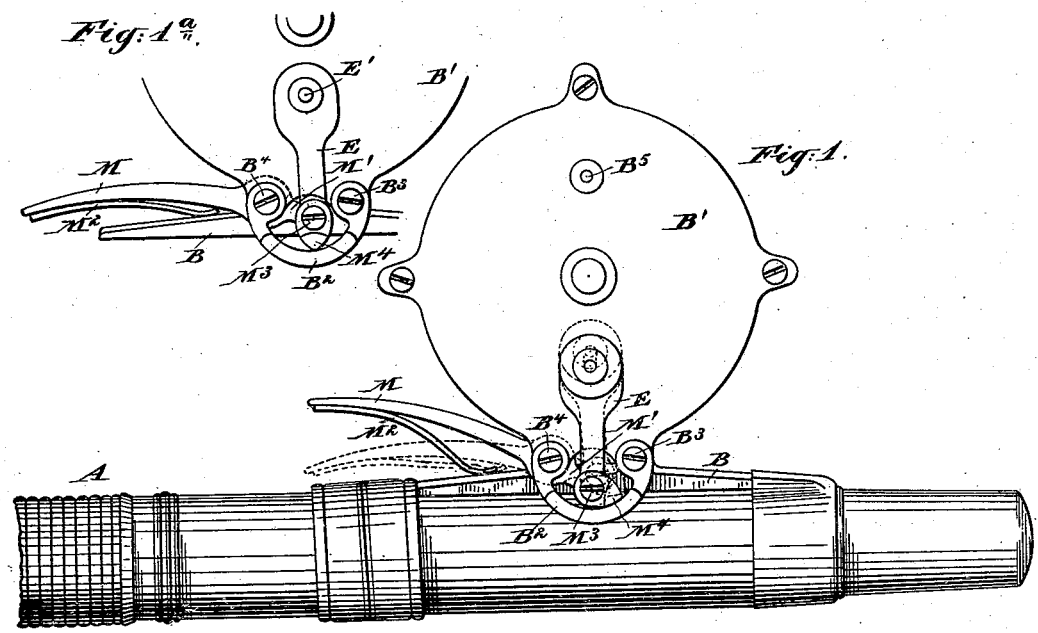
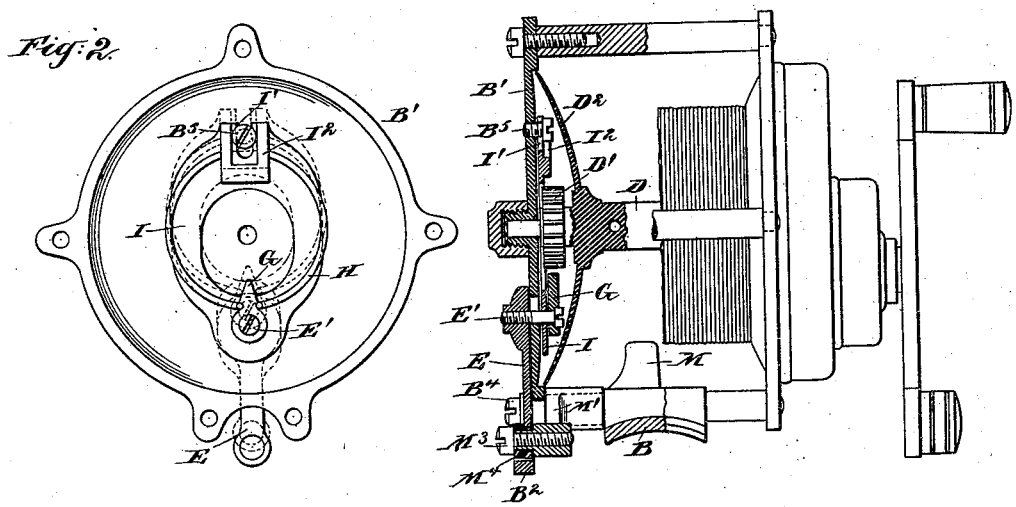
Witnesses:
Charles R. Searle,
Jose L. Singleton.
Inventor:
Alphonso F. Boardman
by his attorney
Thomas Drew Stetson

UNITED STATES PATENT OFFICE.

ALPHONSO F. BOARDMAN, OF BROOKLYN, NEW YORK.

FISHING-REEL.

SPECIFICATION forming part of Letters Patent No. 475,030, dated May 17, 1892.

Application filed February 5, 1892. Serial No. 420,399. (No model.)

*To all whom it may concern:*

Be it known that I, ALPHONSO F. BOARDMAN, a citizen of the United States, residing in Brooklyn, in the county of Kings and State of New York, have invented a certain new and useful Improvement in Fishing-Reels, of which the following is a specification.

The improvement applies to that class of reels in which there is a toothed wheel revolving with the drum as it is rotated by the unwinding of the line, and a click adapted to be engaged with the teeth, as required, to restrain the unwinding of the line from the spool and indicate the action by its clicking sound. I provide a lever and spring, actuated by the finger, for conveniently applying and removing the click and for varying at will the force with which it is urged into engagement with the toothed wheel. This lever also carries a chock, which may be adjusted to hold the click in action for any period, when desired, without requiring attention.

The accompanying drawings form a part of this specification and represent what I consider the best means of carrying out the invention.

Figure 1 is a side elevation showing the reel and a portion of the fishing-rod to which it is attached. Fig. 1$^a$ is a corresponding view of a portion showing the parts differently conditioned. Figs. 2 and 3 show certain portions detached. Fig. 2 is an inside view of the side plate and its attachments which appear in Fig. 1, but without the inverted arch; and Fig. 3 is a central vertical section of the same with a portion of the reel and its shaft and toothed wheel.

Similar letters of reference indicate corresponding parts in all the figures where they appear.

The parts not shown or described may be of any ordinary or suitable construction.

A is the fishing-rod, having a reel-seat provided with the usual sliding rings for engaging with the foot or bottom plate B, on which the reel-body, composed of two side plates B', held firmly at the proper distance apart, and rigid connecting-posts, is fixed in the ordinary and long-approved manner.

B$^2$ is an inverted arch of metal, forming a part of the fixed body and connected to the side plate B' by screws B$^3$ B$^4$. The spool (not shown) is fixed on the shaft D, the latter having bearings in the side plates B' and equipped with the usual toothed wheel D'. (See Fig. 3.)

One of the concave ends D$^2$ of the reel appears in section in Fig. 3. The opposite plate is concaved in the opposite direction and is mounted at the proper distance therefrom to allow the reel to hold the proper quantity of line. The spool is equipped with provisions for turning it to reel in the line by a crank and gearing on the opposite side of the reel.

E is a link mounted on the exterior of the reel-body and capable of being moved up and down. It connects the pin M$^3$ with the pin E', which latter extends through a vertical slot in the side plate B'. On this pin is pivoted the click G, and as the link E is raised and lowered it carries the click G in and out of contact with the toothed wheel D'. The click is capable of turning a little on the pivot E' and is controlled by the usual spring H, engaged in notches—one in each side. This spring and also the pivot-screw E' and click G are all carried on a sliding plate I, which is mounted on the inner face of the side plate B' and is guided at its lower end by the pivot E'. An open slot I at its upper end receives a guide-screw B$^5$, set in the body B'. Additional thickness is given to the plate at the upper end by a reinforcing-piece I$^2$, which holds the spring H.

M M' is a lever turning on an axis B$^4$ in the lower portion of the body and provided with a spring M$^2$, which abuts on the top of the foot B and tends to raise the long arm M of the lever. The short arm M' of this lever carries the pivot-screw M$^3$, which engages the link E, and through it the click G, and also engages a chock M$^4$, which may be turned into position to support the parts against the tension of the spring M$^2$ when required.

As shown in strong lines in Fig. 1, the spool is free to be turned in either direction by any force. When the lever M is depressed into the position shown in dotted lines in Fig. 1, the pin M$^3$ is raised, carrying with it the link E, which elevates the plate I. This brings the click G into engagement with the toothed wheel D', and the force with which it is thus engaged may be increased and diminished at will by the action of the finger on the lever M. As this lever is pressed down the click G is raised into more forcible action on the toothed wheel, and as the pressure of the finger is relaxed and the lever M is allowed to rise the plate I is allowed to sink and the click acts with less force. When the lever is entirely liberated, the plate I sinks sufficiently to bring the click entirely out of contact with the toothed wheel.

There are conditions under which it is desired to liberate the lever M and still keep the click in engagement with the toothed wheel. For this purpose I provide a turning chock $M^4$. This is capable of turning on the screw $M^3$ as a pivot, and is ready to act on the inverted arch $B^2$. This is shown in Fig. 1 in its idle position. When it is to be put in use, it is necessary simply to depress the lever M to its full extent, thereby raising the pin $M^3$ and its connections to their extreme position, and then to turn the chock $M^4$ down into a vertical position. Now when the lever M is liberated it cannot rise, because the chock $M^4$ strikes the inverted arch $B^2$ and holds the short arm M′ of the lever up. In this condition (see Fig. 1$^a$) the click G will remain strongly engaged with the toothed wheel, and if the spool is turned by any cause, as a fish running out with the line, the click will give warning.

I claim as my invention—

1. In a fishing-reel, the sliding plate I, guided as shown on the inner face of one of the side plates B′, in combination therewith and with the spring H and the pivot E′ for the click G, the spring set in the upper and the pivot set in the lower part of said plate and extending through a sufficient aperture in the side plate B′, allowing it to be operated from the outside and arranged to serve as herein specified.

2. In a fishing-reel, the sliding plate I, guided as shown on the inner face of one of the side plates B′, in combination therewith and with the spring H and pivot E′ for the click G, the first set in the upper and the latter in the lower part of said plate, and with the lever M M′ and spring $M^2$ and a connection E between these parts, all arranged for joint operation substantially as herein specified.

3. In a fishing-reel, the sliding plate I, guided as shown on the inner face of one of the side plates B′, in combination therewith and with the spring H and pivot E′ for the click G, the first set in the upper and the latter in the lower part of said plate, means, as the lever M M′, for conveniently controlling said plate at will, and the adjustable chock $M^4$, adapted to hold said click engaged for any period when desired, all arranged to serve as herein specified.

In testimony that I claim the invention above set forth I affix my signature in presence of two witnesses.

ALPHONSO F. BOARDMAN.

Witnesses:
 T. BROWN,
 A. TOARSPERN.